United States Patent [19]

Foerch et al.

[11] Patent Number: 5,612,097
[45] Date of Patent: Mar. 18, 1997

[54] PLASMA ASSISTED GRAFTING OF MALEIC ANHYDRIDE TO POLYOLEFINS

[75] Inventors: Renate Foerch, Oestrich-Winkel, Germany; Duncan H. Hunter; Mary J. Walzak, both of London, Canada; Blair A. Graham, Brights Grove, Canada

[73] Assignees: The University of Western Ontario, in trust for Surface Science Western; The University of Western Ontario, both of London; The Institute For Chemical Science and Technology, Sarnia, all of Canada

[21] Appl. No.: 458,246

[22] Filed: Jun. 2, 1995

[51] Int. Cl.⁶ ....................................................... C08J 7/18

[52] U.S. Cl. ..................... 427/491; 427/296; 427/430.1; 427/512; 427/536; 427/553; 427/575; 427/595

[58] Field of Search ..................................... 427/296, 491, 427/512, 536, 553, 575, 595, 430.1

*Primary Examiner*—Bernard Pianalto
*Attorney, Agent, or Firm*—Armstrong & Pilo

[57] ABSTRACT

A method for grafting maleic anhydride groups to the surface of polyolefins is described. The method uses an excited inert gas phase species in contact with the polyolefin and solid maleic anhydride. The surface functionality is identified by X-ray photoelectron spectroscopy and transmission Fourier transform infrared spectroscopy. The modified polyolefin has an increased ability to form a thermal bond with metals, including aluminum.

6 Claims, 4 Drawing Sheets

Binding Energy/eV

PLASMA ASSISTED GRAFTING OF MALEIC ANHYDRIDE TO POLYOLEFINS

BACKGROUND OF THE INVENTION

This invention relates to polymer surfaces and in particular to their reaction with organic molecules to provide a functionalized surface. In particular, it relates to a new method of grafting maleic anhydride (MAH) to the surface of a polyolefin.

Polyolefins are well known industrially for their chemically inert surfaces. As an example, polypropylene, one of the most commonly used polyolefins in commercial applications, has a typical surface energy of approximately 30–40 dynes/cm and bonding or coating requires 50 dynes/cm and above.

There are a number of bulk properties that make polyolefins such as polypropylene or polyethylene desirable for use in the car parts industry. Uses in this industry sector include bumpers, fascia, interior components, seals and weather stripping. Polypropylene is also used in the manufacture of compression moulded parts for various applications, such as toys. It is also spun into fibres for the manufacture of clothing.

The increased use of polypropylene and other polyolefins is related to the low material cost, excellent mechanical properties, recyclability and excellent processability.

The applications for specific surface modification of polyolefins are many and diverse. They can include modification to allow or disallow interactions between the layers of polymers, addition of surface groups to provide a conductive surface and modification of biomedical resins to facilitate biological reactions or separations.

In many instances it is desirable to have specific functionality at the surface of a material to provide improved bonding, an antibacterial barrier, a reactive group for further manipulation or a surface with a specific reactivity. These surfaces may be in the form of films, moulded parts, fibres or powders.

In applications where one would like oxygen functionality at the surface of a polyolefin such as polypropylene, without sacrificing any of the bulk properties, a number of treatments have been well investigated. These include corona discharge, flame, glow discharge plasma, chemical priming and ultraviolet light in the presence of ozone—all well-known in the art.

These techniques work satisfactorily well but tend to result in a mixture of oxidized functionalities at the surface.

One common process currently employed in industry arose from the desire to bond polypropylene to a metal surface. This process involves adding an organic molecule, such as maleic anhydride (MAH), to bulk polymer to promote adhesion between the polyolefin and other polymer or metal surfaces. One present industrial method to accomplish this is to reactively co-extrude the polymer premixed with fairly high levels of the organic molecule in the presence of a peroxide radical to initiate the reaction.

Problems with this method include incomplete incorporation of the organic molecule as well as extensive cross linking or chain scissioning of the polymer. The cross linking increases the viscosity of the polymer and increases the residence time in the reactor. The increased time in the reactor can lead to many side reactions and an undesirable product.

Although resin made by this method works satisfactorily in forming polymer-to-metal and polymer-to-polymer bonds, the bulk of the resin contains the reactive molecule even though only the top few layers of atoms is needed to provide the bond. This current process thus makes ineffective use of the organic molecule. It also uses excessive reagent and modifies the bulk properties of the resin to the extent that loss of the mechanical properties and a decrease in processability can occur.

The problems that are encountered with the use of excessive amounts of modifying organic molecules also include phase separation, where the initiator dissolves in the organic component and causes it to react with itself before it can react with the resin. There are also problems encountered with incompatibilities between the polymer and the organic molecule in the extrusion. The temperatures in the extrusion barrel must be monitored closely to provide optimum reactor conditions.

This method is also limited in the types of molecules which can be incorporated.

SUMMARY OF THE INVENTION

In the present invention a remote plasma method is used to graft MAH to the surface of solid polyolefin. This is accomplished in a reaction mixture of solid MAH and polyolefin particles exposed to the downstream products of an inert gas (e.g. argon) plasma generated in a microwave cavity. The resultant polymer is shown to exhibit good thermal bonding characteristics to metals, including aluminum, while retaining the other advantages of the polyolefin.

BRIEF DESCRIPTION OF DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENTS

The method of the present invention will be described with reference to following experimental results. The experiment used polypropylene as a typical polyolefin and argon as the inert gas. The polypropylene was in solid form in the form of beads.

Figure 1:
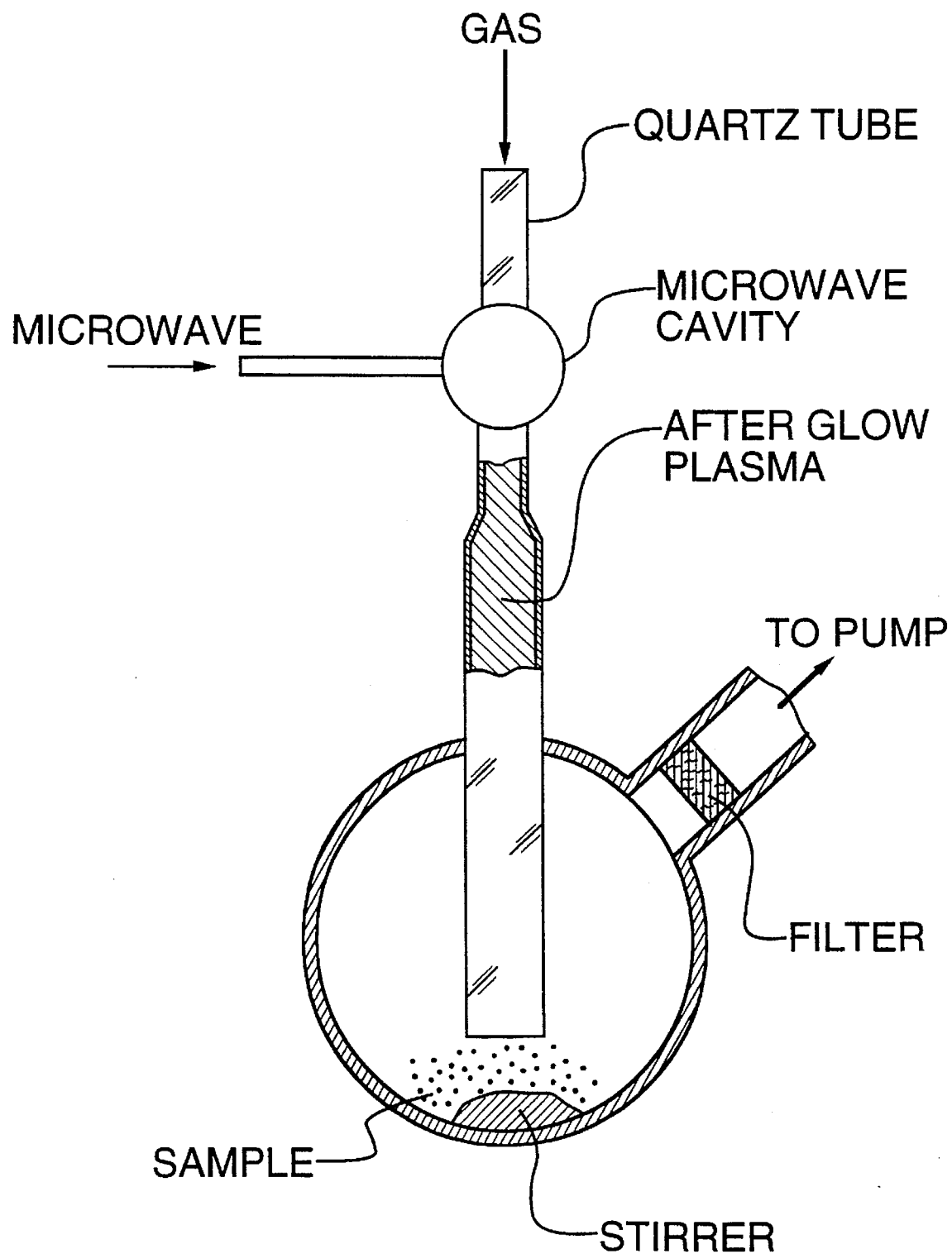
FIG. 1 is a reaction system used to treat polyolefin (polypropylene) particles in the downstream flow of a microwave-induced argon plasma.

The reaction system for used in the experiment for grafting the MAH to polypropylene particles is shown in FIG. 1.

A charge of ~1 g of 1 mm diameter polypropylene beads (ESSO) was placed in a two-necked 100 mL round bottomed Pyrex flask. One neck was connected to the plasma discharge tube on which was mounted an Evenson microwave cavity.

High purity argon gas was passed through the cavity at flow rates of 400–2000 sccm controlled using an MKS Instruments mass flow controller.

The other neck of the flask is pumped by a high speed single stage mechanical pump that maintains the pressure in the reaction chamber at 50–150 Pa depending on the inlet flow of argon.

The polypropylene charge was mixed with MAH (Sigma Chemical Co.) in a ratio by weight of about 0.75/1 to 2/1 (MAH/PP). During exposure to the downstream plasma, the reaction mixture was stirred by a glass coated magnetic stirring bar.

Reactions were carried out for periods ranging from 5 to 30 minutes. After reaction the polypropylene was washed several times in reagent grade methylene chloride (Fisher) to remove any unreacted maleic anhydride and then allowed to dry in air.

Surface composition was measured using several spectroscopic techniques. X-ray photo-electron spectroscopy (XPS or ESCA) gave elemental composition and chemical structure information about the outermost ~3 nm of surface. These measurements were made in an SSL SSX-100 photoelectron spectrometer using monochromatized Al K$\alpha$ exciting radiation. High resolution C(1s) spectra could be resolved to a peak width (half-maximum) of 1.1 eV. Peak shapes are fitted with a mathematical routine. The hydrocarbon C(1s) peak was corrected in each case to a binding energy of 284.9 eV. The elemental composition ratio is determined using Scofield cross-sections.

Transmission Fourier transform infrared spectroscopy (FTIR) was carried out on compression-moulded specimens. These specimens were analyzed using the standard curve for extrusion-mixed maleic anhydride and polypropylene and the results were expressed as a bulk concentration of MAH in the polyolefin.

The adhesion strength between the MAH-grafted polypropylene and an aluminum substrate was measured by a peel test on an Instron Tester, Model 1123. The samples were compression-moulded at 205° C., for 5 minutes, at 5000 psi against an aluminum surface which had been freshly cleaned in a UV-ozone reactor. The samples were measured in duplicate or triplicate and the values averaged.

Plasma-treated samples were compared with polypropylene controls and commercially-available polypropylene beads which had been extruded with MAH (Fusabond P MZ-109D). This commercial product had a stated bulk concentration of MAH (~0.6%) which was similar to that measured by FTIR for the plasma-treated moulded film.

Figure 2A:
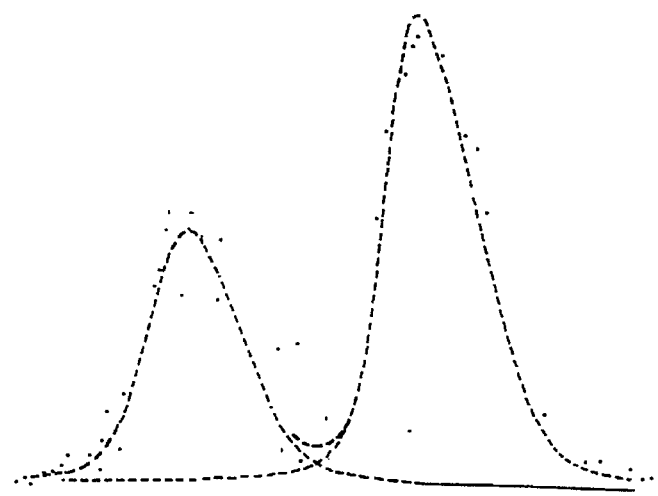
FIG. 2a is a carbon (C(1s)) X-ray photoelectron spectra of pure maleic anhydride crystals dispersed on an indium metal surface.

Reaction of the argon plasma with the MAH/polypropylene bead mixture results in a distinct change in the XPS spectrum of the surface of the treated and washed beads. This can be seen in FIGS. 2a–c where the C(1s) spectra of treated polypropylene beads are compared with the spectrum of MAH.

Figure 2B:
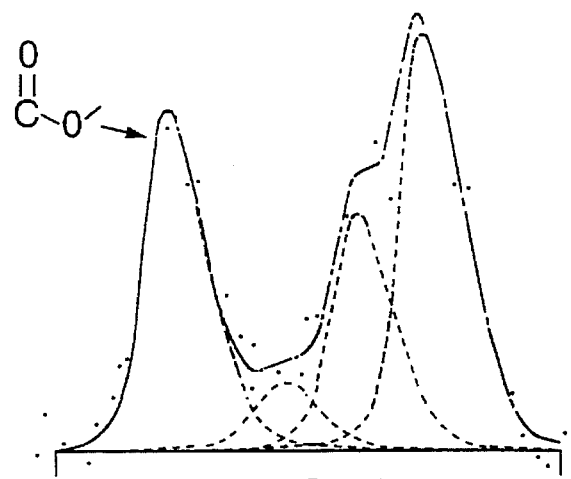
FIG. 2b is a carbon (C(1s)) X-ray photoelectron spectra of polypropylene powder treated for 15 minutes with MAH in a ratio of 1/2 in the downstream flow of a 30 Watt argon plasma.
Figure 2C:
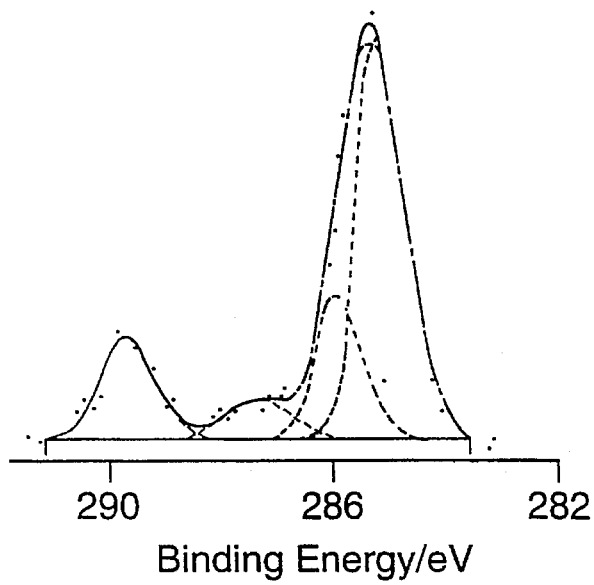
FIG. 2c is a carbon (C(1s)) X-ray photoelectron spectra of polypropylene powder treated with MAH in a ratio of 2/1 under similar conditions to 2b. The spectrum in 2a was obtained under lower resolution conditions than those in 2b and 2c.

The theoretical XPS spectrum of MAH is expected to have two significantly shifted peaks of equal intensity. The spectrum in FIG. 2(a) obtained for the MAH showed a strong chemical shift between vinyl carbons and the anhydride carbonyl carbons, with somewhat higher intensity for the former carbons. FIGS. 2(b) and 2(c) show C(1s) spectra of polypropylene surfaces plasma treated with MAH with different reactant/polymer concentration ratios. Both spectra show a prominent high binding energy peak shifted 4.6±0.1 eV higher than the carbon peak at 285 eV found in polypropylene. This is a very similar shift to that seen in poly(ethylene-co-maleic anhydride)(1:1) of 4.4 eV for the carbon doubly and singly bonded to oxygen. The additional peaks observed in our spectra shifted 1.4±0.1 eV and 2.9±0.1 eV above the hydrocarbon peak, as shown in FIGS. 2(b) and 2(c). These could be ascribed to oxidation of the polypropylene itself or possibly the ether and carbonyl functionalities respectively. These may result from MAH which has undergone decomposition in the reaction.

Figure 3:
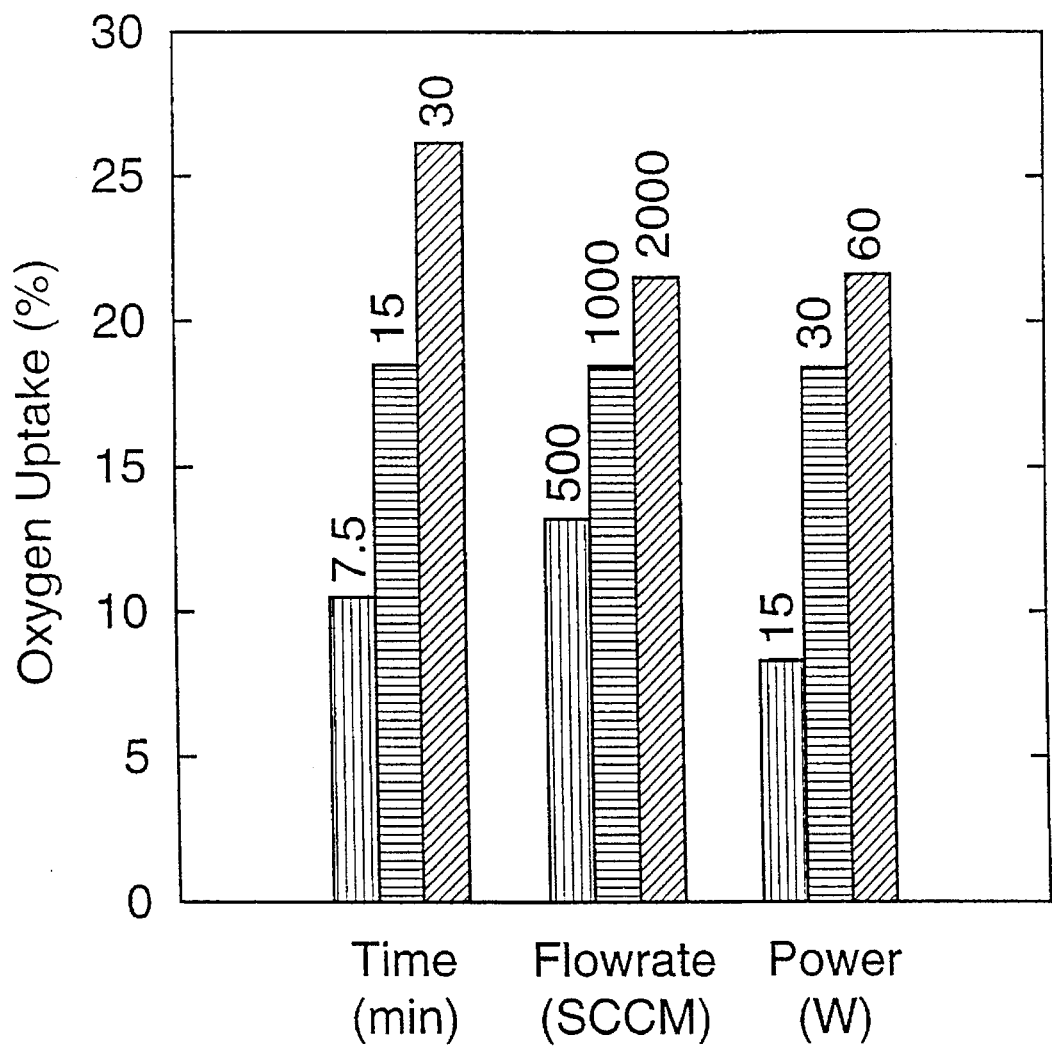
FIG. 3 is a bar graph showing the effects of treatment time, gas flow and plasma power on the concentration of oxygen imparted to the polypropylene surface as determined in the XPS measurements of the O(1s) line. For time measurements, a gas flow rate of 1000 sccm and 30 Watts plasma power were used. For flow rate studies, a 15 minute reaction time and 30 Watts power were used. For power studies, a 15 minute reaction time and 1000 sccm gas flow rate were used.

The relative intensity of the peak in the XPS spectrum attributed to the carbon singly and doubly bonded to oxygen as in the anhydride was studied as a function of treatment time, flow rate and plasma power (FIG. 3). Increasing reaction time, argon flow rate and microwave power leads to increased oxygen uptake, to a maximum of 35%.

Figure 4:
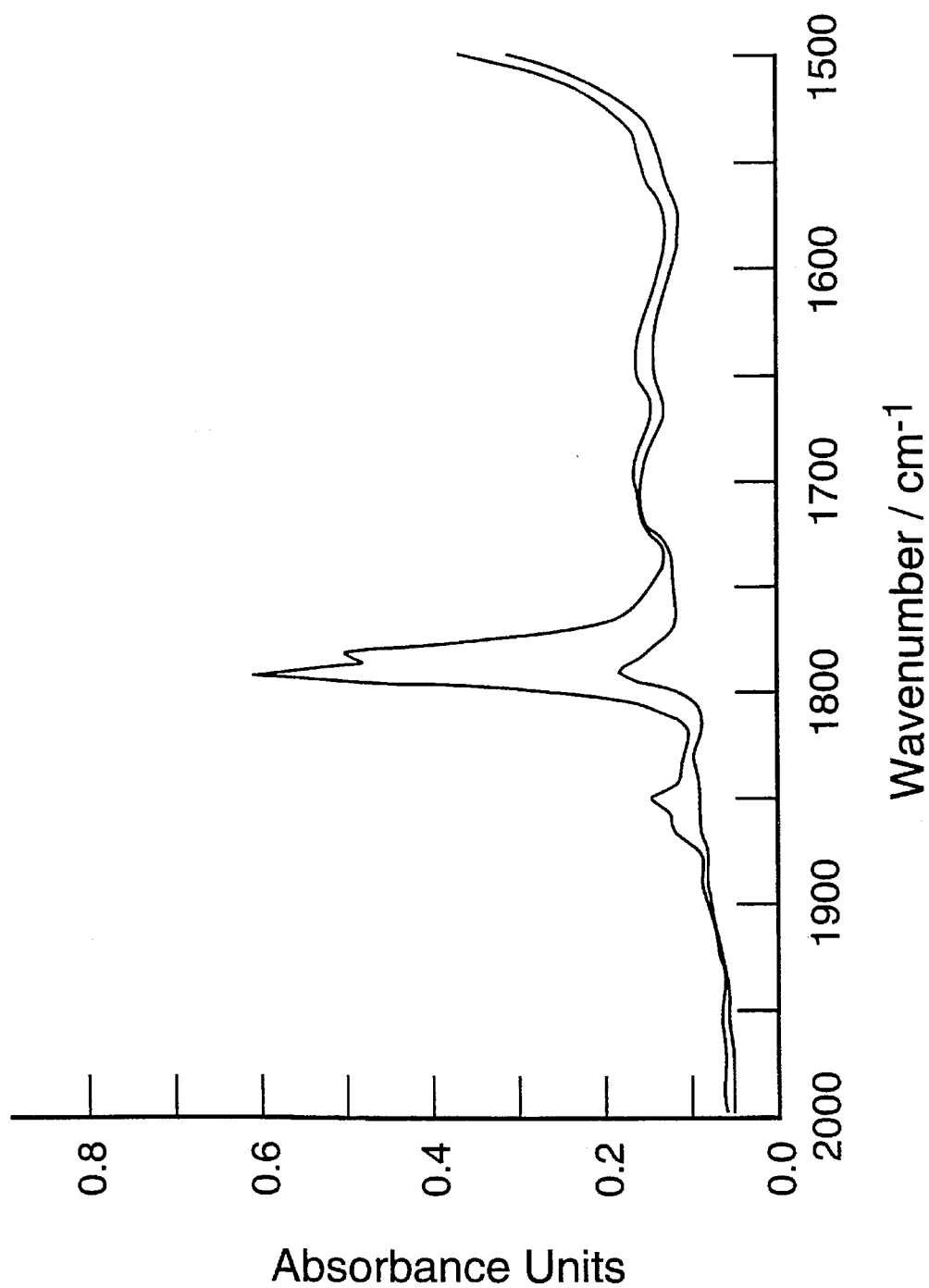
FIG. 4 is an infrared spectra of compression-moulded films from treated polypropylene powder. Spectrum (a) is equivalent to a bulk film concentration of 0.6% (atomic). Spectrum (b) is equivalent to a bulk concentration of 0.08%.

In FIG. 4 are the FTIR spectra obtained for the compression moulded specimens of reacted polypropylene. These are very similar to those seen for a MAH-polypropylene copolymer. Reference spectra for the polyethylene and polystyrene MAH co-polymers show the stronger C=O stretch at 1779.8 cm$^{-1}$ and the weaker peak at 1849.8 cm$^{-1}$. Spectra of our plasma-grafted polymers show the stronger peak at 1791 cm$^{-1}$ and the corresponding weaker peak at 1850 cm$^{-1}$ consistent with a cyclic anhydride.

The concentration of the MAH in the films produced by lamination to aluminum of the plasma-treated polypropylene particles ranged from 0.11–0.59%. These values were based on transmission spectra which report the bulk concentration of MAH in the laminate using reference polypropylene films containing a range of MAH concentrations. The concentrations of MAH measured in these films were considered low in terms of the concentrations usually required to produce good bonding of the laminate prepared from extruded material. Analysis showed approximately 0.35 wt % MAH content as a percentage of the bulk composition.

The peel test results (see Table 1) showed that the adhesion strength for the plasma-reacted surfaces was significantly greater than for the polypropylene control samples. Sample #3 in Table 1 is unmodified polypropylene and shows a maximum peeling load of 0.88 lbs. and an average peeling load of 0.49 lbs. between a 90 and 120 mm displacement. Samples 4, 5 and 6 are MAH modified polypropylene and the Table shows that a greater maximum and average peeling load is required to peel the polymer from the aluminum. Samples 7 and 8 are commercially available polypropylene/MAH products. Sample 8 could not be peeled from the aluminum but it was brittle. Sample 7 was not brittle and displayed very similar maximum and average peeling loads to Sample 5. Two of the plasma-modified samples exceeded the maximum and average peeling loads for the commercial sample #7. Further, the peel behaviour of the treated samples appeared to be more predictable than for the commercial, extruded product; in one case the bond to the extruded product failed at low strain rates. In another case, the polymer failed cohesively due to brittleness. It appears that the argon plasma treatment of polypropylene in a MAH mixture has succeeded in bonding MAH to a substantial fraction of the polymer surface.

The plasma-induced bonding of MAH to polypropylene occurs between the two solids while they are in contact during stirring. Reaction could be initiated with the creation of a polymer free radical by contact with electronically-excited argon atoms from the plasma. Plasma-induced reactivity of polymer surfaces is believed to be sustained for periods of milliseconds in some circumstances; this creates a pathway for initiation of a reaction between the polymer and the MAH.

TABLE 1

Peel Strengths of Polypropylene Laminates From Clean Oxidized Aluminum

| Sample & Description | Maximum Peeling Load (g) | Average Peeling Load (g) |
|---|---|---|
| #3, polypropylene control; 5 minutes; compression | 400 | 230 |
| #4; polypropylene/MAH plasma treated; 15 minutes; 30 Watts, 1000 sccm* | 1700 | 1230 |
| #5; polypropylene/MAH plasma treated; 15 minutes; 30 Watts, 2000 sccm* | 700 | 540 |
| #6; polypropylene/MAH plasma treated; 15 minutes; 30 Watts, 400–500 sccm* | 1230 | 930 |
| #7; Commercial polypropylene/maleic anhydride* | 770 | 540 |
| #8; Commercial polypropylene/maleic anhydride* | † | ‡ |

*These laminates were produced with a 5 minute compression time.
Note:
Samples #1 and #2 were trial runs, to determine the optimum compression time on the polypropylene control.
† Cannot peel apart
‡ Well adhered but brittle The fact that relatively low concentrations of MAH resulted in a satisfactory bond suggests that its preferential location at the surface of the polypropylene particles was important during the compression moulding to the aluminum surface.

In summary, MAH has been grafted to a polypropylene surface using downstream argon plasma products to activate the process. The grafted surface is shown to form adhesive bonds to a clean aluminum surface.

It should be appreciated that the above description relates to the preferred embodiment by way of example only. Many variations on the invention will be obvious to those knowledgeable in the field, and such obvious variations are within the scope of the invention as described and claimed, whether or not expressly described.

In particular, this principle may be applied to maleic anhydride grafted to other polymers or may be used to attach other functional, non-traditional species.

The embodiments of the invention in which an exclusive property or privilege is claimed are defined as follows:

1. A process for grafting maleic anhydride, in the solid state, to the surface of a solid polyolefin, said process comprising the steps of mixing solid maleic anhydride with a solid polyolefin and exposing the resultant mixture to an inert gas plasma in a low pressure environment.

2. A process as recited in claim 1, where said exposure to said inert gas plasma is in the afterglow region of said plasma.

3. A process as recited in claim 1, where said polyolefin is polyethylene.

4. A process as recited in claim 1, where said polyolefin is polypropylene.

5. A process as recited in claim 1, where said inert gas is argon.

6. A process as recited in claim 1, where the inert gas plasma is generated using microwave radiation.

\* \* \* \* \*